(12) United States Patent
Gringel et al.

(10) Patent No.: US 11,000,875 B2
(45) Date of Patent: May 11, 2021

(54) METHOD AND DEVICE FOR NARROW SURFACE COATING

(71) Applicant: HOMAG GmbH, Schopfloch (DE)

(72) Inventors: Martin Gringel, Strassberg (DE); Joachim Fetscher, Schopfloch (DE); Matthias Volm, Balingen (DE); Thomas Bettermann, Bielefeld (DE)

(73) Assignee: HOMAG GMBH, Schopfloch (DE)

( * ) Notice: Subject to any disclaimer, the term of this patent is extended or adjusted under 35 U.S.C. 154(b) by 87 days.

(21) Appl. No.: 15/760,616

(22) PCT Filed: Sep. 30, 2016

(86) PCT No.: PCT/EP2016/073438
§ 371 (c)(1),
(2) Date: Mar. 15, 2018

(87) PCT Pub. No.: WO2017/055561
PCT Pub. Date: Apr. 6, 2017

(65) Prior Publication Data
US 2018/0264503 A1    Sep. 20, 2018

(30) Foreign Application Priority Data

Oct. 2, 2015 (DE) ...................... 10 2015 219 108.7

(51) Int. Cl.
B05C 5/02      (2006.01)
B29C 48/02     (2019.01)
(Continued)

(52) U.S. Cl.
CPC .............. *B05C 5/0204* (2013.01); *B27N 7/00* (2013.01); *B29C 48/002* (2019.02);
(Continued)

(58) Field of Classification Search
CPC . B27D 5/003; B05C 5/0204; Y10T 156/1348; Y10T 156/1788; B27N 7/00;
(Continued)

(56) References Cited

U.S. PATENT DOCUMENTS 3,595,203 A    7/1971   Fabulich
3,907,624 A    9/1975   Gravely, Jr.
(Continued)

FOREIGN PATENT DOCUMENTS

CN    102159378 A    8/2011
CN    202123558 U    1/2012
(Continued)

*Primary Examiner* — Carson Gross
(74) *Attorney, Agent, or Firm* — Morgan, Lewis & Bockius LLP

(57) ABSTRACT

The invention relates to a method for edge coating on work pieces, comprising the following steps: inducing a relative movement between a work piece (W) and an application unit (10), which application unit (10) is provided for applying a mass; setting an application region for applying the mass, in particular in accordance with the width of the edge of a work piece to be provided with the mass; applying the mass to an edge of the work piece (W) to form a three-dimensional body. Said work pieces can be, in particular elements or parts from the furniture or components industry.

11 Claims, 4 Drawing Sheets

(51) Int. Cl.
*B29C 48/07* (2019.01)
*B29C 48/00* (2019.01)
*B29C 48/155* (2019.01)
*B27N 7/00* (2006.01)
*B29C 63/00* (2006.01)

(52) U.S. Cl.
CPC .......... *B29C 48/0021* (2019.02); *B29C 48/02* (2019.02); *B29C 48/07* (2019.02); *B29C 48/155* (2019.02); *B29C 63/003* (2013.01); *B29C 63/0026* (2013.01)

(58) Field of Classification Search
CPC ...... B23Q 3/00; B23Q 3/155; B29C 63/0026; B29C 63/003
See application file for complete search history.

(56) References Cited

U.S. PATENT DOCUMENTS

| | | | |
|---|---|---|---|
| 4,378,170 A | 3/1983 | Orr | |
| 6,180,172 B1 * | 1/2001 | Hasenkamp | B05C 1/006 |
| | | | 118/106 |
| 2003/0224078 A1 | 12/2003 | McGuire | |
| 2004/0209085 A1 | 10/2004 | Erb et al. | |
| 2011/0052816 A1 * | 3/2011 | Bagung | B27D 5/003 |
| | | | 427/284 |
| 2011/0183122 A1 | 7/2011 | Schumacher | |
| 2012/0180718 A1 | 7/2012 | Martin | |

FOREIGN PATENT DOCUMENTS

| | | | | |
|---|---|---|---|---|
| DE | 1937847 A1 | 2/1970 | | |
| DE | 2233322 A1 | 1/1973 | | |
| DE | 2945434 A1 | 12/1980 | | |
| DE | 19543901 A1 | 5/1996 | | |
| DE | 10144524 A1 | 3/2003 | | |
| DE | 10317953 B3 | 2/2005 | | |
| DE | 202009016509 U1 * | 4/2011 | ............. | B27D 5/003 |
| EP | 0744260 A1 | 11/1996 | | |
| EP | 2374587 A1 | 10/2011 | | |
| IT | BO20100146 A1 | 9/2011 | | |
| WO | WO-79/00904 A1 | 11/1979 | | |
| WO | 0053387 A1 | 9/2000 | | |

* cited by examiner

METHOD AND DEVICE FOR NARROW SURFACE COATING

TECHNICAL FIELD

The present invention relates to a method for narrow surface coating or for creating an edge closure on the narrow surface of preferably panel-like work pieces. The aforementioned work pieces may in particular be elements or components in the furniture or construction element industry. For example, said components are kitchen countertops, loading boards, floor panels, furniture fronts, etc.

PRIOR ART

The method of providing the narrow side of panel-like work pieces with an edge strip is known. The edge strips are mounted on rollers and removed from such rollers for processing. Since the variant diversity of the edge strips is ever-increasing, the storage and provision of the various edge strips on a processing machine for applying the edge strips to panel-like work pieces requires a high logistical effort with corresponding costs.

Prior art has thus already considered approximately combining the edge strip manufacturing process, both temporally and spatially, with the application of the edge strip. Known in particular as prior art is document WO 00/53387 A1, which shows a method and device for applying a plastic edge strip to a panel-like work piece. To this end, the device comprises an extruder that provides an extruded strip. Said extruded strip is in particular made of a soft PVC material.

Located immediately downstream from the extruder, and close enough for the extruded strip to cool down only slightly and remain sufficiently warm to be deformed, is a molding station. Said molding station comprises a roller with which the extruded strip is deformed.

However, the known process has the disadvantage that a relatively constant generation of the extruded strip occurs and a structural molding in a subsequent step is required in the molding station area.

SUBJECT MATTER OF THE INVENTION

The aim of the present invention is therefore to simplify a small surface coating with a high degree of flexibility, as well as to be able to cost-effectively provide a high-quality coating on panel-like work pieces in particular.

Claim 1 provides a method with which at least one of the aforementioned aims is achieved.

The underlying idea of the invention is, where possible, to be able to waive edge band material for creating the narrow surface closure for preferably panel-like work pieces, or to be able to replace such with relatively thin edge band materials. Accordingly, the narrow surface closure or narrow surface coating ensues by means of a generative process. Said generative process allows the previous edging materials and profiles to be replaced or new combinations to be realized. In addition, it also enables the porous narrow side of a work piece to be compressed and/or refined.

In the context of the invention, the term "width of the narrow side" essentially means an interval between two main sides of a work piece or, in other words, a thickness of the panel-like work piece.

Since the work piece is provided with a mass, which mass comprises, for example, plastic, wood material, such as wood foam, wood flour, sawdust or the like, a metallic or mineral paste, or combinations thereof, the following advantages may be achieved:

individual design of material consistency and color properties according to the work piece.

substitution of edging material, as well as savings on costly edge strip stockpiling.

edge magazine for feeding and applying edging material strips as well as pre-snipping station on the machine may be omitted.

elimination of shocks; caps are eliminated.

A three-dimensional body in terms of the present invention preferably has a thickness of at least 100 μm, when considered perpendicular to the surface of the work piece to be coated.

The application unit according to the invention is designed in such a way that the application region is adjustable or variable, for example by changing the containment structure of the application unit, by exchanging an element of the application unit or the application unit itself, or by triggering a certain number of nozzles of the application unit or varying the size of the nozzle orifice.

The mass in a preferred embodiment is a thermoplastic, thermosetting or elastomeric plastic. Alternatively, however, other lignocellulosic material, such as wood material, in particular wood foam, wood flour, grinding dust, sawdust, cellulose, WPC, wood fibers or combinations of the aforementioned materials or the like may be used within the context of the invention. Furthermore, the mass may also comprise metal pastes or foams, plastic pastes or foams, concrete material, or electrically conductive materials, such as copper paste or an electrically conductive plastic. Materials containing carbon fibers may also be used.

It may also be provided that a narrow side coating ensues with different materials in different sections, or that the materials are mixed before the application thereof. Other embodiments provide that aluminum foam, plastic foam, etc. are used as materials for the narrow side coating.

An advantage of the present invention is that the mass can penetrate into the porous narrow side of the work piece and close it, thus smoothing out any unevenness on the one hand, as well as preventing moisture from penetrating into the material of the work piece to be coated on the other hand.

Moreover, it is also possible to apply a plurality of possibly varying masses to the work piece in one or more stages, which may consist of different material properties. For example, a mass used for energy transmission may be used in sections or layers, thus allowing cell phones to be loaded with the option of inductive charging, wherein the energy required to this end is at least partially guided via a narrow side of a work piece like a loading board of a shelf, or a telephone prepared for inductive charging is charged at this point.

In particular for reinforcing a thin furniture panel and for reducing costs, it is advantageous to use a mass of poor quality and minimum density, such as foams, for example. To this end, corresponding nozzles with different cross-sections and arrangement are used.

It is conceivable that open pores may be closed in sections on the wide sides of the work piece. Likewise, bulky structures (projections) may be applied to the wide sides of the work piece.

According to a preferred embodiment, after applying the mass with the application unit, an inkjet printing device is used to emboss the work piece and/or a three-dimensional body (solid) formed by the application unit or to provide such with a layer, in particular a lacquer. This enables a further refinement of the work piece to be provided.

The mass is preferably pressed onto or into the narrow side of the work piece by means of a so-called pressure roller, a pressure shoe or a doctor's blade, thus allowing a structure to be inserted into the mass, either simultaneously or in a further step.

According to one embodiment, the relative movement between the work piece and the application unit is implemented continuously or discontinuously, while the application unit provides the narrow side of the work piece with the mass.

It is also conceivable that the mass protruding beyond the narrow side is stripped off by means of a molding agent (molding shoe, rotatable profiled roller), or the protruding mass is brought into a desired "edge profile" (e.g. tonne profile, U-shaped profile, S-shaped profile). This ensues in at least one throughput. In the event of a plurality of throughputs, the previously introduced mass may also cool down. This may cause differences between the mass introduced into the narrow side and the "edge profile mass" with respect to material properties, consistency and color.

Although one purpose of the present invention provides that conventional edge bands may be replaced by the applied mass, it is conceivable according to a further purpose that the mass is used both as filler for filling and closing the open-pored/porous narrow side, as well as an adhesive, wherein additives lend the mass additional adhesive properties. This enables a separate coating material (edging material) to be press-bonded to the work piece immediately after applying the mass. A foil or an edging material may also be applied as a decorative layer. Likewise, it may be that the adhesive has already been applied to the edging material and is bonded via activation with the mass.

It is advantageous when the hardened mass is reworked by machining (milling, grinding). A lacquer application (protection, color) is also advantageous.

It is advantageous when the mass is put into a flowable or paste-like state by means of microwave, laser radiation, IR, plasma, hot air, microwave, in order to enable rapid processing. This in turn allows work pieces—that are conveyed separately in the event of a throughput means with a gap—to be accurately provided with the mass.

It is also advantageous when the mass is hardened by means of microwave, laser radiation, IR, plasma, hot air, microwave, in order to ensure rapid further processing of the mass or easier handling of the work pieces.

Furthermore, it is possible to design the mass in such a way that it may be used as connecting element/functional part (e.g. fitting part).

A device is also provided having: an application unit, wherein the application unit is configured to apply the mass to a narrow side of a work piece (W), and is adjustable to adjust an application region of the application unit, in particular according to the width of the narrow side of the work piece. The adjustment of the application region may be initiated by a control device, for example by changing the containment structure of the application unit, by exchanging an element of the application unit or the application unit itself, or by triggering a certain number of nozzles of the application unit or varying the size of the nozzle orifice. The device also comprises a feeder for feeding a mass to the application unit and a device for inducing a relative movement between a work piece and the application unit.

The device is in particular configured to implement the method listed in claim 1. Further preferred embodiments of the device are listed in the other dependent claims.

The application unit preferably has at least one nozzle arrangement, which impinges the narrow side at least in sections with the mass, wherein the nozzle arrangement is preferably horizontally aligned. Said nozzle arrangement may have one or more nozzles.

A storage unit for accommodating the mass may also be provided, which is connected with the feeder, wherein the storage unit has a heating unit. Said storage unit may be arranged at the feeder or provided at an interval to the latter.

The application unit in one embodiment may be interchanged with a tool holder, thus allowing the application unit to be exchanged.

Furthermore, a machining tool, in particular a milling cutter or a scraper, and the application unit may be attached to a common carriage, which may be moved along a guide, thus enabling accelerated processing.

Furthermore, the device may comprise a pressure device, in particular a pressure roller, for pressing the mass onto the narrow side of the work piece, thus allowing the surface of the mass to be further refined or compressed. According to a further aspect, it is possible to introduce structuring into the mass.

The application unit may have a base section, a first adjusting section, as well as a second adjusting section, wherein the first adjusting section and the second adjusting section may each be moved relative to the base section, in order to adjust the application region of the application unit.

A further embodiment provides that the first adjusting section has an inclined surface or curved surface (12b) facing a base surface of the base section and the second adjusting section has an inclined surface or curved surface facing a base surface of the base section.

In addition, the inclined surfaces or curved surfaces could be preferably pivotable relative to the base section.

BRIEF DESCRIPTION OF THE ILLUSTRATIONS

Figure 3:
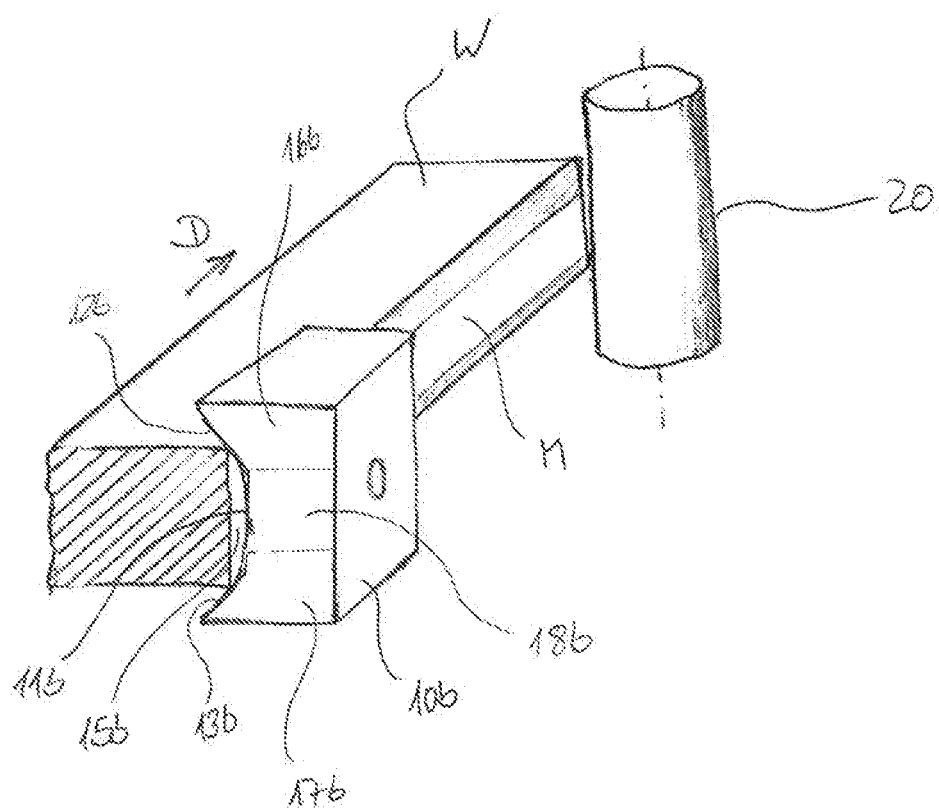

FIG. 3 constitutes a further variant of the present invention.

Figure 4:
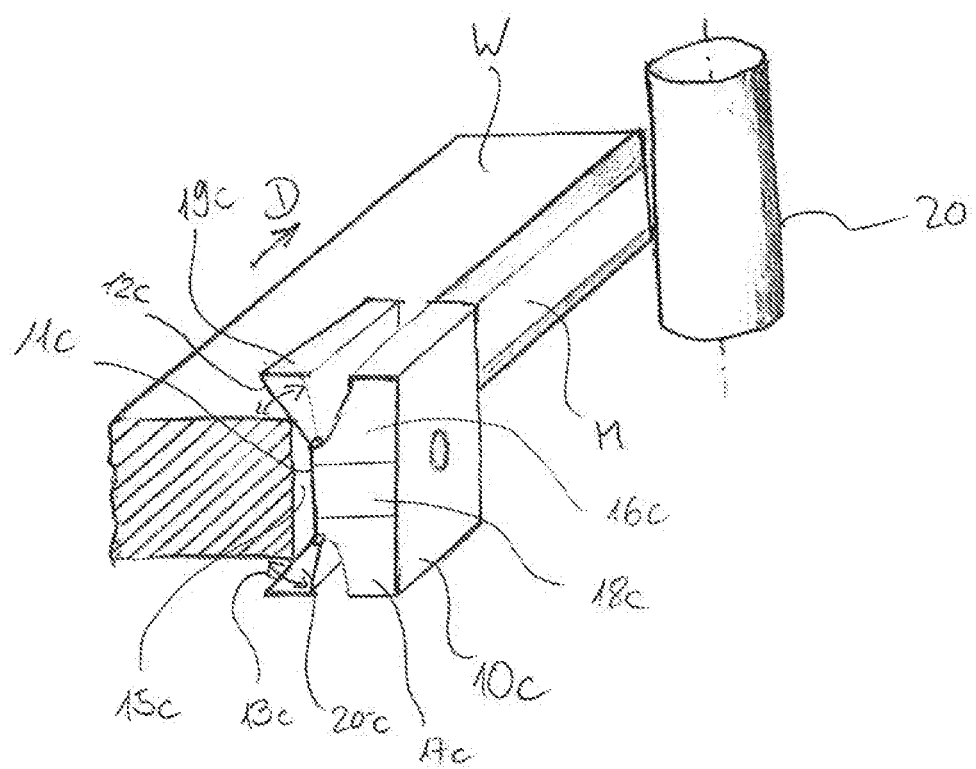

FIG. 4 illustrates another variant of the present invention.

DETAILED DESCRIPTION OF THE PREFERRED EMBODIMENTS

Exemplary embodiments of the present invention are described in the following on the basis of the enclosed illustrations. Modifications of individual features can be individually combined with each other to form new embodiments.

Figure 1:
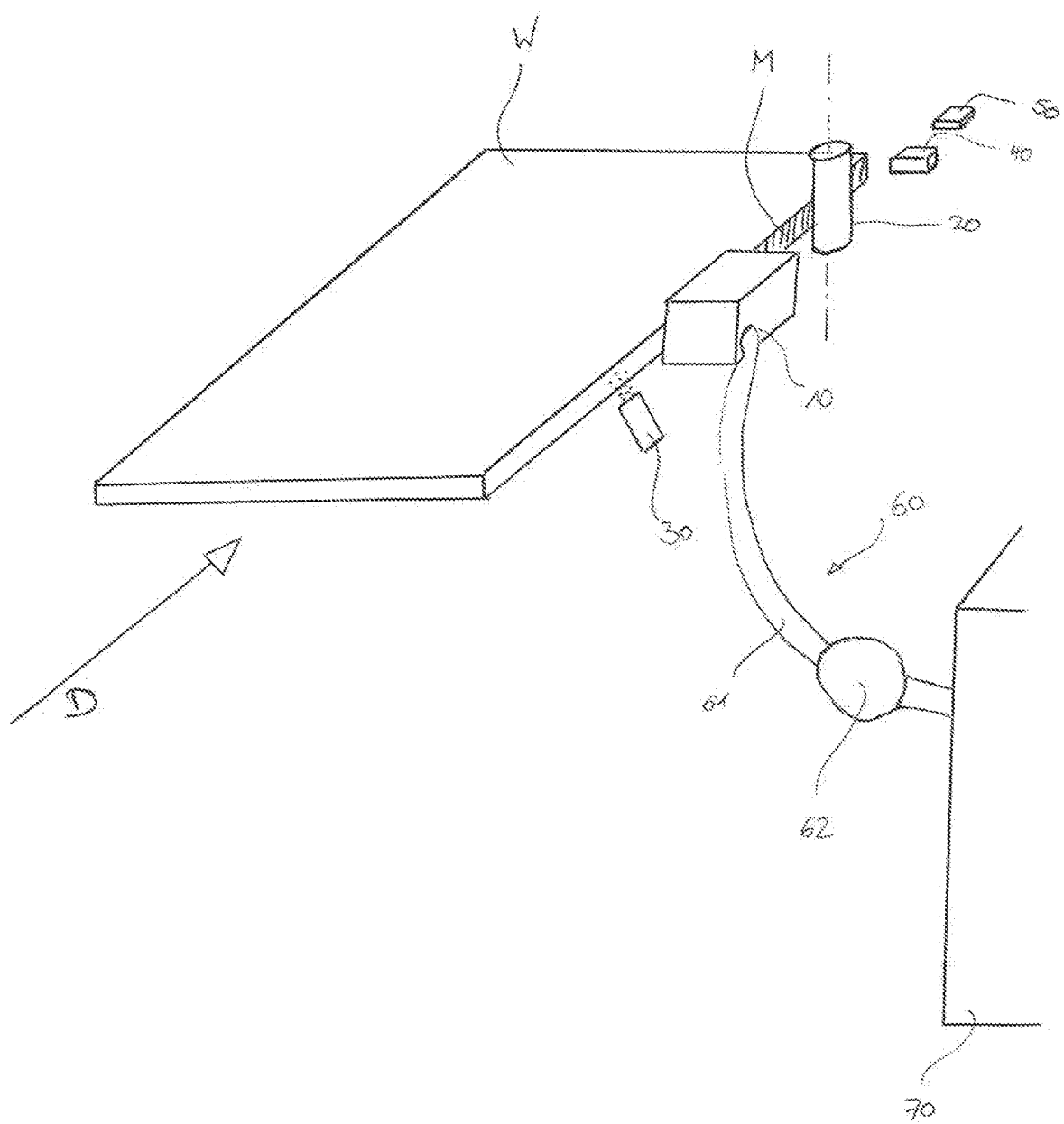
FIG. 1 shows an exemplary embodiment of the present invention.

A panel-like work piece W (for example a kitchen countertop, a furniture front or the like) is moved in the illustrated embodiment by means of a conveyor, in particular a transport belt or a transport chain. The direction of movement in FIG. 1 is flagged by the reference sign D. Initially located in the throughput direction D is a pre-treatment module 30, with which a subsequent processing of a narrow side of the work piece W is prepared. According to one embodiment, the pre-treatment module 30 is used to direct a jet of compressed air onto the narrow side of the work piece W, in order to remove chips or similar impurities from the narrow side of the panel-like work piece.

Furthermore, the device comprises an application unit 10. Said application unit 10 is connected with a feeder 60, by means of which feeder 60 a flowable mass M is transported from a storage unit 70 to the application unit 10. The feeder 60 comprises at least one line 61, which is designed as a flexible hose in the present invention, as well as a possible pump device 62. Alternatively, a pump device may also be provided in the area of the storage unit 70 or of the application unit 10.

The application region of the application unit may be adjusted or varied, in that an element of the application unit or the application unit itself is exchanged, or a certain number of nozzles of the application unit are triggered or the size of the nozzle orifice is varied.

A pressure device 20 in the form of a pressure roller is also provided subordinately in the throughput direction D of a work piece W. The axis of rotation of the pressure roller is concealed in the vertical direction. The axis of rotation of the pressure roller 20 is preferably in the direction of the work piece W and may be moved away from the latter, thus allowing a pressing force to be varied on the one hand and the possible varying thickness of the applied mass to be taken into account on the other hand.

According to the present invention, the pressure roller 20 is designed as a cylindrical body with constant diameter. However, according to an alternative embodiment, the pressure roller may also have a varying diameter.

For example, the pressure roller 20 allows radii to be introduced into the area of the corners of the panel-like work pieces by deforming the mass, which is already located on the narrow side and may already be partially hardened.

It is also possible to use a pressure roller in the form of an embossing roller, with which a profile is pressed into the mass applied to the narrow side. Profiling enables the narrow side of the work piece W, which is provided with the mass, to be additionally provided with a property haptically coordinated with the decor. For example, a profile that haptically and/or optically imitates a wooden surface may be introduced into the mass.

According to the present embodiment, a refining module 40 is located subordinately in the throughput direction D of the pressure roller 20. Such a refining module may be designed in various ways, for instance as a heating unit, UV lamp or a cooling unit.

A refining module designed as a heating unit allows the mass applied to the narrow side to be re-heated, in order to improve the surface properties thereof or to keep or put said mass in a paste-like or at least partially deformable state for further processing.

A UV lamp is in turn used to enable a mass M provided with UV-crosslinked particles to be hardened more quickly.

In addition, the refining module 40 allows other subordinate processing steps to be prepared, for example by cleaning, degreasing, improving the adhesive and wetting properties and/or reducing the electrostatic charge.

According to the present embodiment, the device illustrated in FIG. 1 also comprises an inkjet printing device 50. Said inkjet printing device 50 is used to apply a decorative surface to the mass applied to a narrow side of the work piece W. The decorative surface may, for example, be coordinated with the structure introduced into the mass by means of the pressure roller 20. In a concrete example, a surface structure characteristic of a wooden surface is embossed by means of the pressure roller 20, and the appropriately prepared surface structure is provided with a decor imitating a wooden surface from an optical point of view.

Figure 2:
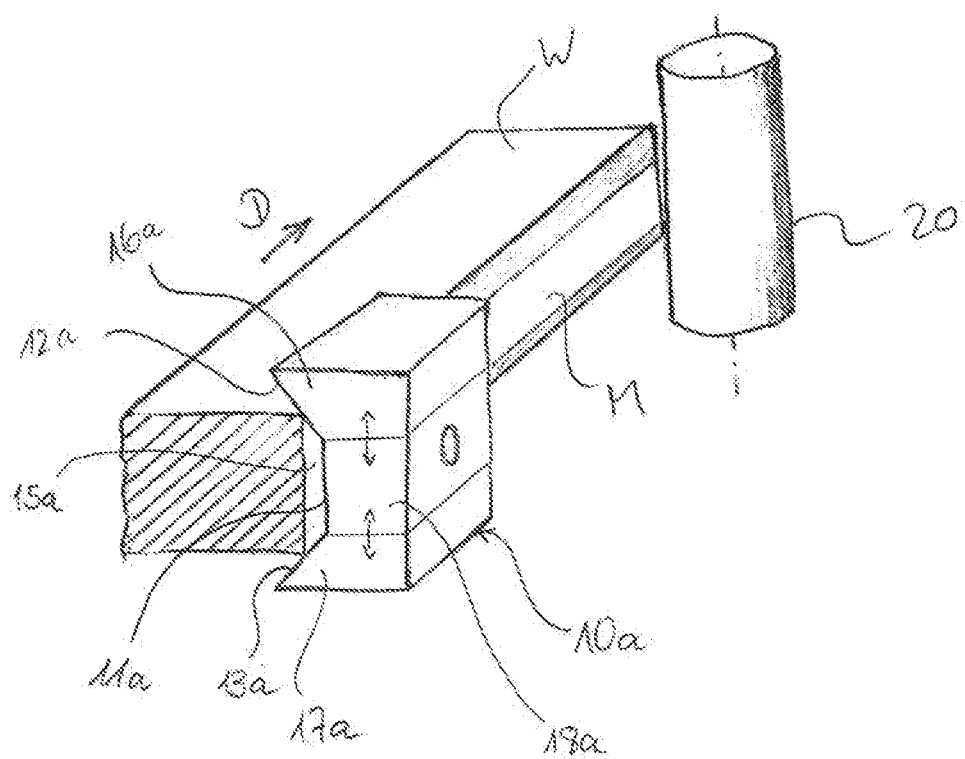
FIG. 2 shows a further embodiment of the present invention.

FIG. 2 shows a further embodiment according to the present invention. The embodiment shown in FIG. 2 differs from that shown in FIG. 1, due, inter alia, to the design of the application unit 10a.

Further assemblies, such as the pre-treatment module 30, the refining module 40, the inkjet printing device 50, the feeder 60, as well as the storage unit 70, may each individually also be used in the embodiment shown in FIG. 2. The same applies to the further embodiments in FIGS. 3 and 4.

The application unit 10a is funnel-shaped in design in the direction of a work piece W to be provided with the mass M. In particular, the application unit 10a comprises an essentially vertically aligned base surface 11 a, pointing in the direction of a narrow side of a work piece W, in the region of which at least one outlet opening for the mass M to be applied to the work piece W is formed. Furthermore, the application unit 10a comprises inclined surfaces 12a, 13a, which extend from the base surface 11a to form an angle of 45°, for example.

According to the present embodiment, the application unit 10a comprises a base section 18a, which has the base surface 11a pointing towards the work piece, as well as an upper adjusting section 16a with the inclined surface 12a as well as a lower adjusting section 17a with an inclined surface 13a. The upper adjusting section 16a and the lower adjusting section 17a may each be telescoped relative to the base section 18a, thus changing the height of the base surface pointing towards the work piece.

An alternative possibility is to replace an element of the application unit with certain inclined surfaces 12a, 13a by another element with different dimensions, thus allowing an application region to be adjusted or varied.

According to the embodiment shown in FIG. 2, in one area of the inclined surfaces 12a a work piece W transported in the throughput direction approaches the inclined surfaces 12a, 13a of the application unit 10a or touches said inclined surfaces, and therefore an open volume range 15a is formed in front of and behind the application unit 10 in the throughput direction D between the narrow side of the work piece W, the base surface 11 a as well as partial areas of the inclined surfaces 12a, 13a of the application unit 10a.

The application unit 10a presses the preferably paste-like mass to be applied to a narrow side of the work piece W into this volume range 15a, which is then transferred to the narrow side of the work piece W during the relative movement between work piece W and application unit 10a.

In the embodiment of the application unit 10a shown in FIG. 2, fibers are introduced into the individual corner area of the narrow side of the work piece W, by means of the inclined surfaces 12a, 13a, when applying the mass M.

Since the application unit 10a has the upper adjusting section 16a with the inclined surface 12a as well as the lower adjusting section 17a with an inclined surface 13a, which may be telescoped in relation to the base section 18a, this allows the application region of the application unit to be adjusted.

Furthermore, the position of a work piece may be varied transversely to the throughput direction. For example, should a work piece of minimal thickness be guided into the area of the application unit 10a as a preceding work piece, the aforementioned work piece of minimal thickness is placed offset on the (unillustrated) conveyor, and therefore the corners of the narrow side of the work piece come into contact with the inclined surfaces 12a, 13a or approach said inclined surfaces, thus reducing the volume range 15a in the vertical direction. In order to maintain the thickness of the mass to be applied, the adjusting sections 16a, 17a may be moved.

The pressure roller shown in FIG. 2 serves to improve the adhesion of the mass of a narrow side of the work piece by applying an additional pressing force and, if necessary, to further temper and smooth the surface.

According to a further modification of the present invention (see FIG. 3), an application unit is provided, which has curved surfaces 12b, 13b, instead of the inclined surfaces 12a, 13a (and/or in addition to the latter), which approximately or completely come into contact with the corners of a work piece W in the area of the narrow side. A base surface 11b extends between the curved surfaces 12b, 13b. A radius may thus be formed in the individual corner areas of the narrow side by means of the curved surfaces 12b, 13b.

Furthermore, according to the embodiment show in FIG. 2, the application unit 10b is designed as a multi-piece construction, and comprises a base section 18b, as well as an upper adjusting section 16b and a lower adjusting section 17b. The upper adjusting section 16b and the lower adjusting section 17b may each be telescoped relative to the base section 18b, thus changing the height of the base surface pointing towards the work piece.

FIG. 4 shows a schematic representation of a further embodiment of the present invention. The application unit 10c in the variant illustrated in FIG. 4 comprises a base section 18c with a base surface 11c pointing towards the work piece, as well as an upper adjusting section 16c and a lower adjusting section 17c. The upper adjusting section 16c is provided with a first pivotable section 19c and the lower adjusting section 17c is provided with a second pivotable section 20c, wherein the pivotable sections 19c, 20c may be pivoted around a horizontal axis relative to the base body 18c of the application unit 10c. The first pivotable section 19c comprises an inclined surface 12c, which may be brought completely or approximately into contact with an upper corner of a work piece W. Furthermore, the second pivotable section 20c comprises an inclined surface 13c, which may be brought completely or approximately into contact with a lower corner of a work piece W. The base surface 11c, the inclined surfaces 12c, 13c and the narrow side of the work piece W thus form a volume range 15c.

An individual pivoting movement of the first pivotable section 19c and of the second pivotable section 20c, as well as a vertical adjusting movement of the adjusting sections 16c, 17c, allows the volume range 15c to be changed. This adapts the application unit 10c to narrow sides of different thicknesses.

According to another modification, the application unit comprises a structure-forming mattress in the subordinate area of the throughput direction, with which the mass introduced into the volume range through the outlet opening of the application unit is reformed in the not yet hardened state. This then allows an undulating structure to be introduced into the mass.

Although the present embodiments have primarily been described in respect of a device and a method by means of which a work piece is moved, while the application unit and, if necessary, other devices are at least arranged in a stationary manner during the application of the mass, the present invention may also be used in the event of a device and a method by means of which the work piece is held, for example, by means of suction clamps or terminal clamps, while the application unit and, if necessary, other devices, which are preferably secured on a common carriage, are moved relative to the work piece.

The invention claimed is:

1. A device for narrow side coating work pieces, having:
    an application unit having at least a nozzle arrangement for applying a mass,
    wherein the application unit is configured to apply the mass to a narrow side of a work piece, and an application region of the application unit is adjustable according to the width of the narrow side of the work piece;
    a feeder comprising a line for feeding the mass to the application unit;
    a conveyor device for inducing a relative movement between the work piece and the application unit; and
    a pressure device for pressing the mass onto the narrow side of the work piece,
    wherein the application unit comprises an upper adjusting section and a lower adjusting section, and wherein the upper adjusting section and the lower adjusting section of the application unit are configured to change in order to adjust the application region of the application unit.

2. The device according to claim 1, wherein the nozzle arrangement at least impinges the narrow side in sections with the mass.

3. The device according to claim 1, also having a storage unit for accommodating the mass, which is connected with the feeder, wherein the storage unit has a heating unit.

4. The device according to claim 1, wherein the application unit is interchangeable with a tool holder.

5. The device according to claim 1, wherein a machining tool and the application unit are attached to a common carriage, which is moveable along a guide.

6. The device according to claim 1, wherein the pressure device is a pressing roller.

7. The device according to claim 1, wherein the application unit further comprises a base section, wherein each of the upper adjusting section and the lower adjusting section is moveable relative to the base section, in order to adjust the application region of the application unit.

8. The device according to claim 7, wherein the upper adjusting section has an inclined surface or curved surface facing a base surface of the base section, and the lower adjusting section has an inclined surface or curved surface facing a base surface of the base section.

9. The device according to claim 2, wherein the nozzle arrangement is horizontally aligned.

10. The device according to claim 5, wherein the machining tool is a milling tool or a scraper.

11. The device according to claim 8, wherein the inclined surfaces or curved surfaces are pivotable relative to the base section.

* * * * *